US008561105B2

(12) United States Patent
Schultz et al.

(10) Patent No.: US 8,561,105 B2
(45) Date of Patent: Oct. 15, 2013

(54) SYSTEM AND METHOD FOR A SCHEDULE SHIFT FUNCTION IN A MULTI-CHANNEL BROADCAST MULTIMEDIA SYSTEM

(75) Inventors: Mark Alan Schultz, Carmel, IN (US); Ronald Douglas Johnson, Westfield, IN (US); Matthew Robert Lamb, Westfield, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 338 days.

(21) Appl. No.: 12/735,867

(22) PCT Filed: Nov. 4, 2008

(86) PCT No.: PCT/US2008/012456
§ 371 (c)(1),
(2), (4) Date: Aug. 20, 2010

(87) PCT Pub. No.: WO2010/053465
PCT Pub. Date: May 14, 2010

(65) Prior Publication Data
US 2011/0004901 A1 Jan. 6, 2011

(51) Int. Cl.
*G06F 13/00* (2006.01)
*G06F 3/00* (2006.01)
*H04N 5/445* (2011.01)

(52) U.S. Cl.
USPC .................. 725/39; 725/50; 725/74; 725/75; 725/76; 725/77; 725/86; 725/88; 725/89

(58) Field of Classification Search
USPC .................. 725/39, 50, 74–77, 86, 88–89, 55
See application file for complete search history.

(56) References Cited

U.S. PATENT DOCUMENTS 4,646,280 A 2/1987 Toyosawa
(Continued)

FOREIGN PATENT DOCUMENTS

CN 1717024 1/2006
(Continued)

OTHER PUBLICATIONS

European Search Report dated Dec. 10, 2009.
Business Wire, "AMD Powers Up AMD Live!(TM) Horne Media Server Introducing Easy, Universal.Control of a Home Network", Nov. 5, 2007.
AT&T, AT&T Introduces U-Verse in Austin, Business Wire, Nov. 8, 2007.
Monsoon, "HAVA Video Streaming and Place-Shifting Devices", Press Release, Nov. 7, 2007.
(Continued)

*Primary Examiner* — Mulugeta Mengesha
(74) *Attorney, Agent, or Firm* — Robert D. Shedd

(57) ABSTRACT

A global program guide pause function in a broadcast multimedia system including a first main control configured to process multimedia content received from a packet processor, the first main control including an analyzer module for acquiring and analyzing program guide data to determine multiple time-delayed start content, a filtration module for filtering undesired content and enabling desired data streams to be saved in at least one global memory device, and a guide module for creating a program guide comprising only non-filtered programs being offered at time-delayed start times. The guide module is further configured to create multiple listings in the program guide showing a real-time versus a delayed-start time for each non-filtered program. A popular stream packet processor can be provided for saving data content corresponding to popular programs.

20 Claims, 7 Drawing Sheets

(56) References Cited

U.S. PATENT DOCUMENTS

| | | | | |
|---|---|---|---|---|
| 5,357,250 | A | 10/1994 | Healey et al. | |
| 5,418,863 | A | 5/1995 | Ando | |
| 5,596,647 | A | 1/1997 | Wakai et al. | |
| 5,801,786 | A | 9/1998 | Song | |
| 5,854,591 | A | 12/1998 | Atkinson | |
| 5,896,129 | A | 4/1999 | Murphy et al. | |
| 5,956,094 | A | 9/1999 | Chun | |
| 5,973,722 | A * | 10/1999 | Wakai et al. | 725/76 |
| 5,995,553 | A | 11/1999 | Crandall et al. | |
| 6,014,381 | A | 1/2000 | Troxel et al. | |
| 6,052,384 | A | 4/2000 | Huang et al. | |
| 6,058,288 | A | 5/2000 | Reed et al. | |
| 6,249,913 | B1 | 6/2001 | Galipeau et al. | |
| 6,262,737 | B1 | 7/2001 | Li et al. | |
| 6,278,375 | B1 | 8/2001 | Hucker | |
| 6,323,767 | B1 | 11/2001 | Gropper | |
| 6,363,207 | B1 | 3/2002 | Duruoz et al. | |
| 6,377,188 | B1 | 4/2002 | Maruyama | |
| 6,393,343 | B1 | 5/2002 | Frey et al. | |
| 6,463,273 | B1 | 10/2002 | Day | |
| 6,539,548 | B1 | 3/2003 | Hendricks et al. | |
| 6,559,812 | B1 | 5/2003 | McCarten et al. | |
| 6,728,269 | B1 | 4/2004 | Godwin et al. | |
| 6,744,967 | B2 | 6/2004 | Kaminski et al. | |
| 6,745,021 | B1 | 6/2004 | Stevens | |
| 6,762,733 | B2 | 7/2004 | Smith et al. | |
| 6,813,777 | B1 | 11/2004 | Weinberger et al. | |
| 6,938,258 | B1 | 8/2005 | Weinberger et al. | |
| 6,978,424 | B2 | 12/2005 | Safadi | |
| 7,003,052 | B2 | 2/2006 | Koike et al. | |
| 7,028,304 | B1 | 4/2006 | Weinberger et al. | |
| 7,075,945 | B2 | 7/2006 | Arsenault et al. | |
| 7,114,171 | B2 | 9/2006 | Brady, Jr. et al. | |
| 7,130,724 | B2 | 10/2006 | Petersen et al. | |
| 7,159,230 | B2 | 1/2007 | Manson et al. | |
| 7,159,231 | B1 | 1/2007 | Clark | |
| 7,167,639 | B2 | 1/2007 | Haddad et al. | |
| 7,174,085 | B2 | 2/2007 | Demas et al. | |
| 7,177,522 | B2 | 2/2007 | MacInnis | |
| 7,194,611 | B2 | 3/2007 | Bear et al. | |
| 7,197,234 | B1 | 3/2007 | Chatterton | |
| 7,200,859 | B1 | 4/2007 | Perlman et al. | |
| 7,230,652 | B2 | 6/2007 | Demas et al. | |
| 7,257,308 | B2 | 8/2007 | Plourde, Jr. et al. | |
| 7,260,312 | B2 | 8/2007 | Srinivasan et al. | |
| 7,272,298 | B1 | 9/2007 | Lang et al. | |
| 7,272,300 | B2 | 9/2007 | Srinivasan et al. | |
| 7,292,604 | B2 | 11/2007 | Godwin et al. | |
| 7,409,140 | B2 | 8/2008 | Rodriguez et al. | |
| 7,565,104 | B1 | 7/2009 | Brown et al. | |
| 7,640,566 | B1 * | 12/2009 | Taylor et al. | 725/88 |
| 2002/0118951 | A1 | 8/2002 | Suzuki et al. | |
| 2002/0152470 | A1 | 10/2002 | Hammond | |
| 2002/0177996 | A1 | 11/2002 | Cooper et al. | |
| 2003/0025599 | A1 | 2/2003 | Monroe | |
| 2003/0037331 | A1 | 2/2003 | Lee | |
| 2003/0084451 | A1 * | 5/2003 | Pierzga et al. | 725/47 |
| 2003/0093798 | A1 | 5/2003 | Rogerson | |
| 2003/0094659 | A1 | 5/2003 | Goldman | |
| 2003/0114107 | A1 | 6/2003 | Aoyagi | |
| 2003/0208764 | A1 * | 11/2003 | Galipeau et al. | 725/76 |
| 2004/0136408 | A1 | 7/2004 | Tomobe et al. | |
| 2004/0155961 | A1 | 8/2004 | Litwin, Jr. et al. | |
| 2005/0117583 | A1 | 6/2005 | Uchida et al. | |
| 2005/0135787 | A1 | 6/2005 | Yoo et al. | |
| 2005/0138659 | A1 | 6/2005 | Boccon-Gibod et al. | |
| 2005/0201629 | A1 | 9/2005 | Karczewicz et al. | |
| 2006/0020992 | A1 | 1/2006 | Pugel et al. | |
| 2006/0029359 | A1 | 2/2006 | Shigehara et al. | |
| 2006/0136965 | A1 | 6/2006 | Ellis et al. | |
| 2006/0224761 | A1 | 10/2006 | Howarth et al. | |
| 2006/0257099 | A1 | 11/2006 | Potrebic et al. | |
| 2006/0275022 | A1 | 12/2006 | Perlman et al. | |
| 2006/0275023 | A1 | 12/2006 | Perlman et al. | |
| 2006/0277316 | A1 | 12/2006 | Wang et al. | |
| 2007/0011343 | A1 | 1/2007 | Davis et al. | |
| 2007/0021099 | A1 | 1/2007 | Sato | |
| 2007/0065122 | A1 | 3/2007 | Chatterton | |
| 2007/0086488 | A1 | 4/2007 | Kim et al. | |
| 2007/0092078 | A1 | 4/2007 | Yoshida et al. | |
| 2007/0107019 | A1 | 5/2007 | Romano et al. | |
| 2007/0127887 | A1 | 6/2007 | Yap et al. | |
| 2007/0127891 | A1 | 6/2007 | Demas et al. | |
| 2007/0130597 | A1 | 6/2007 | Parker et al. | |
| 2007/0136743 | A1 | 6/2007 | Hasek et al. | |
| 2007/0143809 | A1 | 6/2007 | Chen et al. | |
| 2007/0143813 | A1 | 6/2007 | Chen et al. | |
| 2007/0162392 | A1 | 7/2007 | McEnroe et al. | |
| 2007/0166001 | A1 | 7/2007 | Barton et al. | |
| 2007/0168188 | A1 | 7/2007 | Choi | |
| 2007/0180465 | A1 * | 8/2007 | Ou et al. | 725/34 |
| 2007/0192613 | A1 | 8/2007 | Amoroso et al. | |
| 2009/0320075 | A1 | 12/2009 | Marko | |
| 2011/0007745 | A1 | 1/2011 | Schultz et al. | |
| 2011/0307548 | A1 | 12/2011 | Fisk et al. | |

FOREIGN PATENT DOCUMENTS

| | | |
|---|---|---|
| CN | 1902697 | 1/2007 |
| CN | 1909696 | 2/2007 |
| EP | 0813341 | 12/1997 |
| EP | 0907281 | 4/1999 |
| EP | 1175091 | 1/2002 |
| EP | 1283639 | 2/2003 |
| EP | 1594317 | 11/2005 |
| EP | 1739676 | 1/2007 |
| EP | 1781034 | 5/2007 |
| JP | 01288190 | 11/1989 |
| JP | 578043 | 10/1993 |
| JP | 7130150 | 5/1995 |
| JP | 2001008200 | 1/2001 |
| JP | 2001054066 | 2/2001 |
| JP | 2001160940 | 6/2001 |
| JP | 2002112199 | 4/2002 |
| JP | 2002135729 | 5/2002 |
| JP | 2002269910 | 9/2002 |
| JP | 2003163892 | 6/2003 |
| JP | 200423591 | 1/2004 |
| JP | 2004248138 | 9/2004 |
| JP | 2004282644 | 10/2004 |
| JP | 2005184519 | 7/2005 |
| JP | 2005244404 | 9/2005 |
| JP | 2005310365 | 11/2005 |
| JP | 2005318049 | 11/2005 |
| JP | 2005535170 | 11/2005 |
| JP | 200623748 | 1/2006 |
| JP | 2006109301 | 4/2006 |
| JP | 2006186580 | 7/2006 |
| JP | 2006246297 | 9/2006 |
| JP | 200753738 | 3/2007 |
| JP | 2007158432 | 6/2007 |
| JP | 2008005085 | 1/2008 |
| JP | 2008193295 | 8/2008 |
| JP | 2008539638 | 11/2008 |
| WO | WO9843376 | 10/1998 |
| WO | WO0072592 | 11/2000 |
| WO | WO0271756 | 9/2002 |
| WO | WO03019932 | 3/2003 |
| WO | WO03024085 | 3/2003 |
| WO | WO03032620 | 4/2003 |
| WO | WO03067594 | 8/2003 |
| WO | WO03075574 | 9/2003 |
| WO | WO03092281 | 11/2003 |
| WO | WO2004034707 | 4/2004 |
| WO | WO2005045830 | 5/2005 |
| WO | WO2006114759 | 11/2006 |
| WO | WO2007036833 | 4/2007 |
| WO | WO2007038131 | 4/2007 |
| WO | WO2007056108 | 5/2007 |
| WO | WO2007063430 | 6/2007 |
| WO | WO2007076042 | 7/2007 |
| WO | WO2008026187 | 3/2008 |
| WO | WO2009117050 | 9/2009 |

* cited by examiner

SYSTEM AND METHOD FOR A SCHEDULE SHIFT FUNCTION IN A MULTI-CHANNEL BROADCAST MULTIMEDIA SYSTEM

This application claims the benefit, under 35 U.S.C. §365 of International Application PCT/US2008/012456 and filed Nov. 4, 2008, which was published in accordance with PCT Article 21(2) on May 14, 2010, in English and which claims the benefit of U.S. provisional patent application No. 61/070,074, filed on Mar. 20, 2008, in English.

BACKGROUND

LiveTV™ is a major provider of airline in-flight entertainment systems, namely in-flight satellite-delivered live programming content, and allows air passengers to have the freedom to choose from a wide variety of satellite delivered live programming. Its main product comprises providing in-aircraft seat-back satellite television services, in addition to such services as live flight tracking, which allows people to see their current location during a flight in real-time. Depending on the region of the world the airline operates in, LiveTV™ can utilize different satellite television providers. For example, in the U.S.A. such satellite programming is typically provided by DirecTV™. Thus, in one example, a LiveTV™ system on an airplane can deliver DirecTV™ content to each passenger. A satellite system on an airplane can deliver many channels of content to its passengers in real time. However, if the pilot or stewardess interrupts the programming to make announcements, all of the real time satellite programming content during those announcements is lost.

Individual pause systems are used all over the world to adjust time to accommodate the viewer. Pause functions are well known in devices such as VCRs. For example, if the audio/video source is a VCR tape or tapes, a pause can be implemented by simply pressing the pause button on the VCR and then pressing 'play' when an interruption period is ended to resume playback of the program(s). This form of pause typically does not require any special design techniques. Indeed, a simple pause function for a single program is found today in many homes on a Personal Video Recorder (PVR) or Digital Video Recorder (DVR) unit. The PVR can have a specific design to record and playback programs as specified by its user. In almost all cases, only single programs are adjusted in time and not an entire system. One complication with individual storage systems is that if the viewer changes stations during the program, unless the other program has an equal pause, he will not be able to go back to his original station without losing portions of the original program.

However, providing a pause function in a real time digital streaming environment with hundreds of channels available, such as in an airplane satellite system, presents a challenging problem. This is especially so since the viewer is normally not in control of the video/audio program other than selecting what is available. Pausing a streaming system also introduces complications with system clocks, program guides, and control systems.

SUMMARY

In one embodiment according to the present principles, a system and method is provided for ensuring that viewers watching live broadcast television programming, e.g., live satellite program content on, e.g., an aircraft, bus, train, theater, etc., configured to deliver live broadcast television content, is enabled to tailor and adjust the programming start times of programs to a desired start time. Advantageously, viewers are not constrained by the departure and arrival schedules of a particular transportation vehicle or flight with regards to viewing program content.

According to one aspect, a global schedule pause feature is provided configured to store all of the delivered streams in a buffer, and to enable the delivery of the streamed content to the viewer at multiple, time-delayed start times. Advantageously, the viewers would therefore not miss any of the program content for any of the channels and can select a desired start time for a desired program.

According to one aspect, a system is provided configured to store all of the desired program content from all sources up to a limit of the system's bandwidth and to enable each program to be played back from the beginning at pre-determined delayed start times. Thus, a viewer can select a desired start time of a desired program.

According to another aspect, the program content which is to be stored is filtered so that only program content which is popular and/or likely to be viewed is stored.

Such a system can be simplified, e.g., by providing all of the pause functionality close to the tuner outputs. This eliminates requiring each passenger's set top box to include local storage to provide a pause function. In addition, the passengers do not have to worry about handling and implementing the control functions since the saving and resuming procedures would be automatically performed for all of the programming content. In addition, the data rate for incoming signals can be handled efficiently as one entire system versus handling each channel independently, further simplifying the system's operation and increasing efficiency.

In one aspect of the present principles, a system for providing a global program guide pause function in a broadcast multimedia system is provided comprising a first main control configured for processing audio and video data content received from a packet processor, the first main control comprising an analyzer module for acquiring and analyzing program guide data to determine multiple time-delayed start content; a filtration module for filtering out undesired content and enabling desired data streams to be saved in at least one global memory device; and a guide module for creating a program guide comprising only non-filtered programs being offered at time-delayed start times.

According to another aspect, a system for providing a global program guide pause function in a broadcast multimedia system is provided comprising a first main control configured for processing audio and video data content received from a packet processor, the first main control comprising an analyzer module for acquiring and analyzing program guide data to determine multiple time-delayed start content;

a filtration module for filtering out undesired content and enabling desired data streams to be saved in at least one global memory device; and a guide module for creating a program guide comprising only non-filtered programs being offered at time-delayed start times, the guide module further configured to create multiple listings in the program guide showing a real-time versus a delayed-start time for each non-filtered program. A popular stream packet processor is provided configured for saving data content corresponding to popular programs.

According to yet another aspect, a method for providing a global program guide pause function in a broadcast multimedia system configured to receive audio and video data content is provided comprising the steps of analyzing program guide data to determine program information; determining a size of pause buffers to determine multiple time-delayed start content; filtering out undesired data content to save desired data content in at least one pause function memory device; and creating at least one of multiple start times for programs comprising popular data content and multiple listings showing a real-time versus a delayed start time for each program in the desired data content.

These, and other aspects, features and advantages of the present principles will be described or become apparent from the following detailed description of the preferred embodiments, which is to be read in connection with the accompanying drawings.

BRIEF DESCRIPTION OF THE DRAWINGS

In the drawings, wherein like reference numerals denote similar elements throughout the views.

Figure 1:
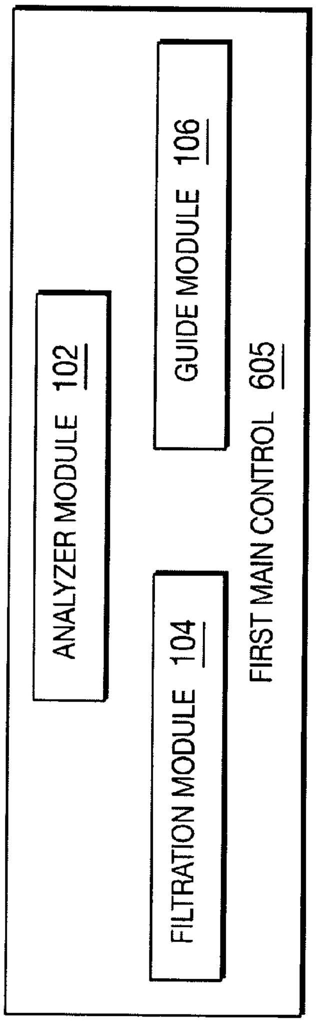
FIG. 1 is an exemplary schematic illustration of a first main control for providing a global schedule pause function according to an aspect of the present principles.

It should be understood that the drawings are for purposes of illustrating the concepts of the present principles and are not necessarily the only possible configurations for illustrating the present principles.

DETAILED DESCRIPTION

A method, apparatus and system for providing a universal or global system program guide pause function for broadcast programming is advantageously provided according to various aspects of the present principles. Although the present principles will be described primarily within the context of an aircraft (in-flight) programming and program guide pause system and method, the specific embodiments of the present principles should not be treated as limiting the scope of the invention. It is appreciated by those skilled in the art and informed by the teachings of the present principles that the concepts of the present principles can be advantageously applied in other environments in which a global program schedule pause function is desired, e.g., broadcast television/radio, satellite radio, cable, etc., in environments having contained, limited audiences such as theaters, and in transportation means such as buses, trains, etc.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it is appreciated by those skilled in the art that the block diagrams presented herein represent conceptual views of illustrative system components and/or circuitry embodying the principles of the invention. Similarly, it is appreciated that any flow charts, flow diagrams, state transition diagrams, pseudocode, and the like represent various processes which can be substantially represented in computer readable media and so executed by a computer or processor, whether or not such computer or processor is explicitly shown.

In accordance with various embodiments of the present principles, a method, apparatus and system is described for providing a system-wide or 'global' pause function, namely, for simultaneously pausing multi-channel broadcast multimedia/television content broadcast to a plurality of viewers in real time. While the present principles can be applicable to any broadcast television system, the examples herein are described in relation to, e.g., aircraft satellite television environments in which television content is displayed to passengers either individually, e.g., in seat-back displays, or in groups, e.g., via a plurality of displays distributed throughout the passenger cabin. Generally, most system providers provide systems with individual controls since people generally desire independence in controlling programming content. However, passengers on trains, buses, theaters, and especially airplanes, tend to be captive audiences. In addition, transportation vehicles typically have varying departure times and schedules, which do not necessarily match broadcast program schedules.

Thus, a system-wide program and schedule pause feature in accordance with the present principles is especially desirable and useful.

According to one aspect of the present principles, a pause function can be implemented on, e.g., an airplane which has the capability of allowing most of the viewed content to be snapped to, e.g., a 30 minute interval so passengers can view entire programs rather than portions of programs, and so none of the desired program content is missed. This is advantageous if the plane leaves at 9:40 and a passenger wants to watch a show that started at 9:30. The passenger would miss 10 minutes without pause, or see the entire show with a 10 minute pause. Since the data is stored once, the capability of reading the data multiple times with, e.g., 5 minute start delays is also a possibility.

A system and method according to the present principles enables channel surfing for the first few minutes across all of the potential programs within the same timeframe. Since all programs are recorded, switching between stations is not a problem since every channel has been recorded at the same time, rather than just the one channel the passenger is watching at any given time. Given enough bandwidth in the memory, the system could store the data once but read it back at certain time intervals (e.g., 5-10 minute intervals) to accommodate multiple viewers requesting shows at multiple times. The system can implement a pause function to store the data and control the playback of the data.

Given a 30 minute storage time (1 Gb/s×60×30=200 GBytes) which is achievable with today's memory, the program guides can display what programs the viewer can watch in their entirety and not limit the programs available to shows already in progress. Advantageously, the program guides can be paused just like the programs to deliver a system that works together.

It is to be noted that each receiver (set top box) can be configured for local storage and allow individual user-enabled 'local' pause functions (e.g., to allow each user to activate a pause mode to pause content at a user-desired time). However, according to one aspect of the present principles, a 'global' or universal pause feature is further provided which does not require user activation and minimizes storage requirements for each set top box receiver. Note also that a global pause function (e.g., a pause function next to the tuners) as according to an aspect of the present principles advantageously allows users/viewers to change content or channels or customize viewing schedules during, e.g., a flight without encountering problems such as loss of data created with previous pauses. For example, a local pause function at each viewer's set top box would typically cause the loss of data whenever a channel change occurs after a pause has been implemented. The loss of data would be the time equal to the sum all of the pauses up to the point of channel change.

Advantageously, a system and method according to the present principles provides a streamlined and efficient manner in which to enable viewers to customize a program schedule to view program content at a desired start time. Further, the present system and method avoids complexity and minimizes the amount of memory needed, thus reducing costs. In one aspect, a 'universal' pause function is provided, in which a pause feature can be implemented at a main controller for automatically storing content from a plurality of channels in real-time. In another aspect, a customized guide is created having only non-filtered programs displayed at multiple delayed start times. Accordingly, each viewer will enjoy viewing of any video/audio programming content at a desired start time and will not miss any of the content, regardless of what channel each individual viewer was watching and without having to manually activate any controls.

Further, the passenger can be given a choice between viewing a program in real time or at a delayed time. This would be advantageous since some programs such as the news or sports might be desirable to be viewed in real time. If a passenger requests to start a program 20 minutes into the flight but everyone else started 10 minutes into the flight, it is still possible to accommodate his request since the data exists in memory.

One method to help reduce the bandwidth required to, e.g., read the data from memory from two different places while still storing new data, is to preselect the programs that are to be saved. Since data, for example, can be received from the satellites, the capability exists to screen the packets in real time to determine if they should be saved or filtered. This reduction in data allows new services such as providing multiple delayed starts of the same program or offering, e.g., a 30 minute program every 30 minutes which was only available every 6 hours via satellite.

Referring now to the Figures, FIG. 1 is an exemplary schematic illustration of a first main control 605 for providing a global program guide pause function according to an aspect of the present principles. The first main control 605 includes an analyzer module 102 configured to perform at least steps 801, 803 and 805 of FIG. 8, that is, to acquire and analyze program guide data, filter high definition streams, assess the size of pause buffers, review the program guide to determine multiple time-delayed start content and re-run the guide to accommodate the pause.

A filtration module 104 is provided for performing, e.g., at least steps 807, 809, 811, namely filtering out undesired program data streams and saving the desired streams, preferably up to the limit of the system bandwidth for reading the streams. If an optional separate packet processor is used for saving popular streams, the most popular or desirable programs are saved in a separate memory in the separate packet processor.

Figure 8:
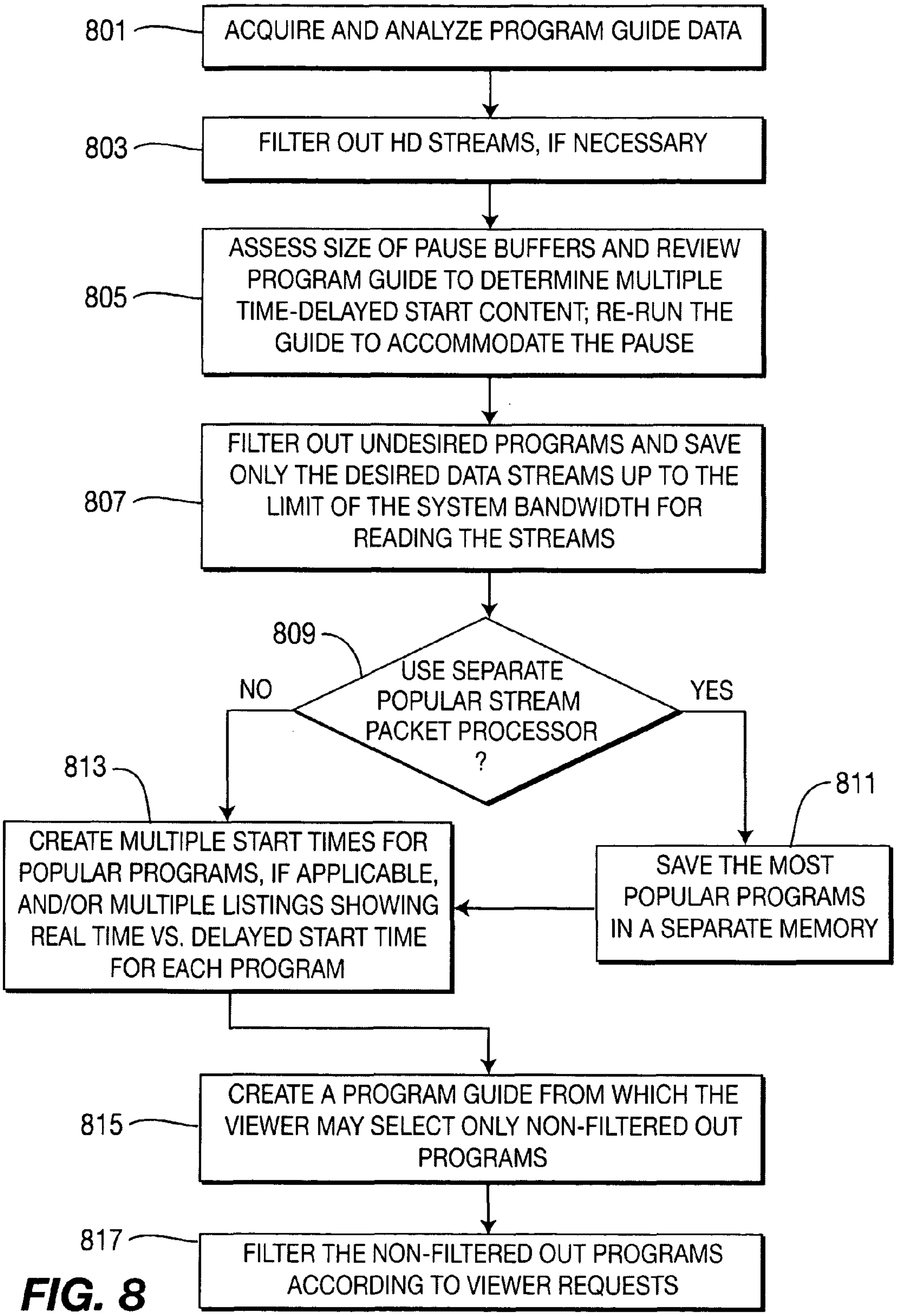
FIG. 8 is an exemplary method flow for global schedule pause processing according to an aspect of the present principles.

A guide module 106 is provided for perform, e.g., at least steps 813 and 815 of FIG. 8, that is, to create a program guide which enables a viewer to select the non-filtered programs. Further, the guide module 106 can create a guide having multiple start times for popular programs, as well as multiple listings for each program that show both the real time versus the delayed starts for each program.

The modules 102, 104 and 106 can alternatively be stored in a memory 211 of the packet processor 103.

Figure 2:
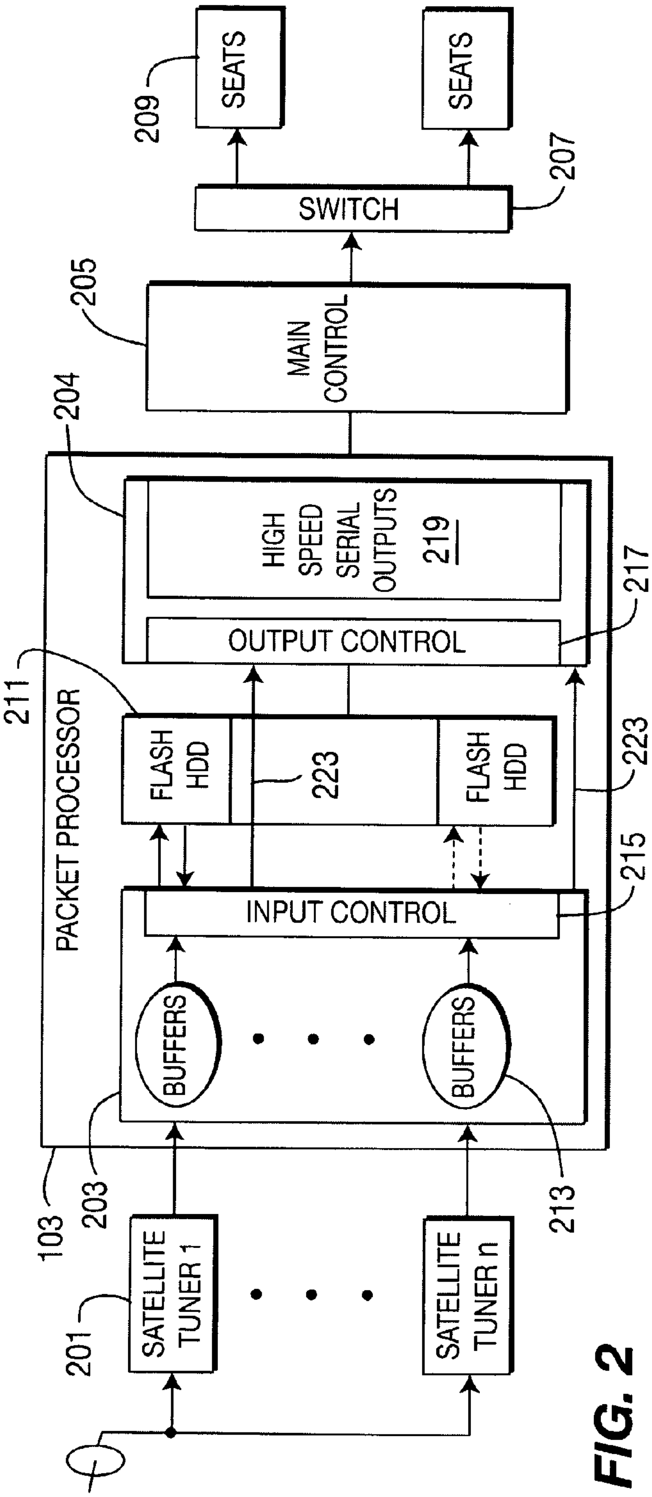
FIG. 2 is an exemplary illustration of a system including a pause packet processor configured for providing a global schedule pause function according to an aspect of the present principles.

FIG. 2 is an exemplary illustration of a system including a pause packet processor 103 configured for providing a global schedule pause function e.g., in an aircraft satellite television system, according to an aspect of the present principles. A plurality of tuners 201 (e.g., tuners (1-*n*)) can be provided, each tuner being configured to receive and process audio/video signals via, e.g., satellite. Each tuner 201 or a group of tuners (1-*n*) is connected to a network or packet processor 103 configured to process packet data transferred from each tuner 101. Multiple packet processors 103 can be provided. Packet processors 103 can include certain features or architectures to enhance and optimize packet processing, such as pattern matching (the ability to find specific patterns of bits or bytes within packets in a packet stream), data bitfield manipulation (the ability to change certain data fields contained in the packet as it is being processed), and queue management (as packets are received, processed and scheduled to be send onwards, they are stored in queues).

Each packet processor 103 is connected to a main controller 205, which itself is connected to and controlled by a switch 207. The switch 207 can comprise, e.g., an 8 port 1000base T switch and can be configured for controlling signal output to any number or grouping of seats 209 (e.g., a plurality of seating 'zones'). For example, switch 107 can be configured for distributing signals to a plurality of zones, each zone including a set top box (STB) receiver which can be functionally connected to a plurality of seat monitors. Any number of seats per STB receiver can be contemplated. For example, each STB can be connected to each other via a 'daisy chain' wiring scheme (electrical bus) configuration.

Figure 3:
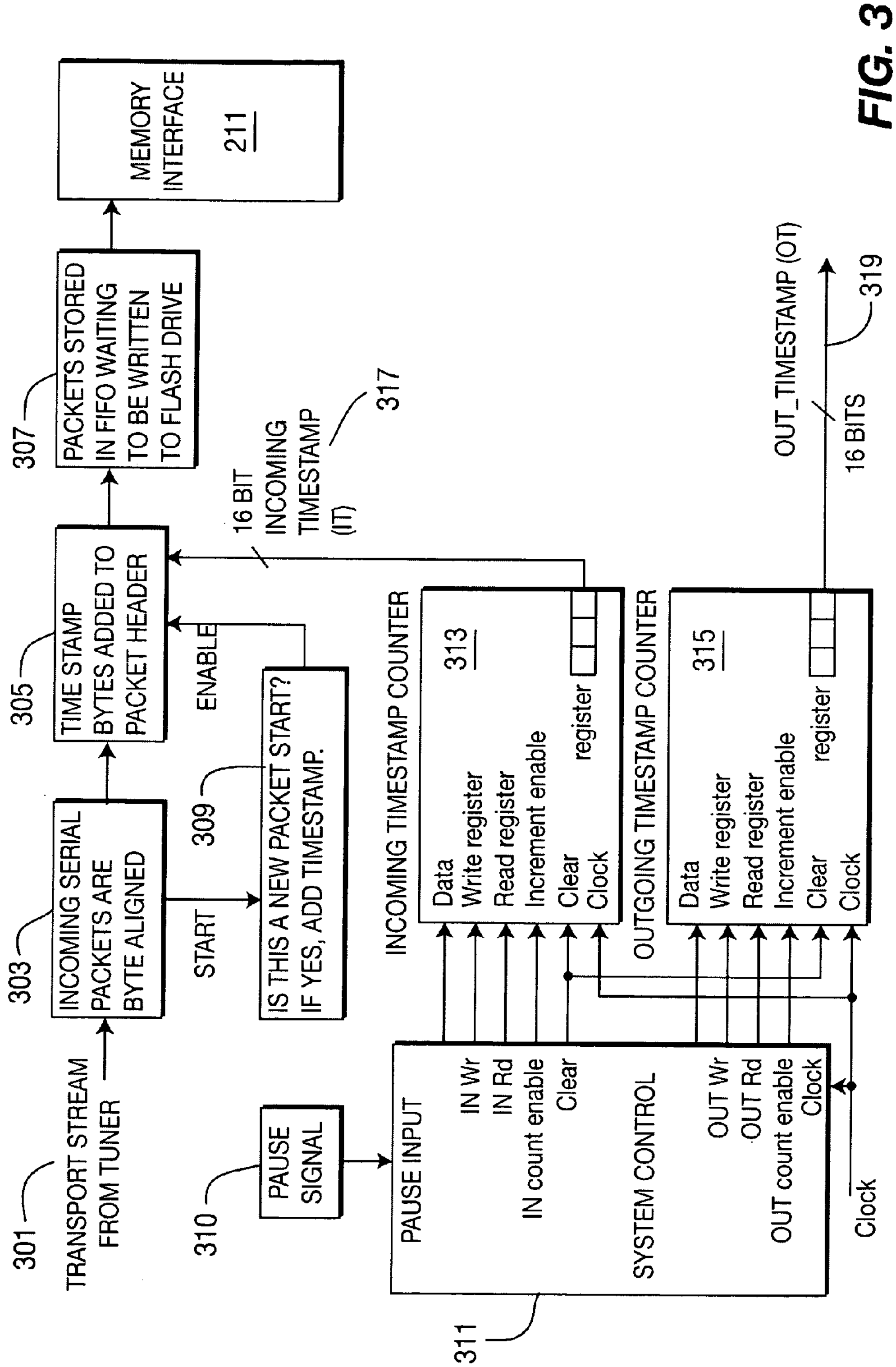
FIG. 3 is an exemplary method flow for global schedule pause processing at an input side according to an aspect of the present principles.
Figure 4:
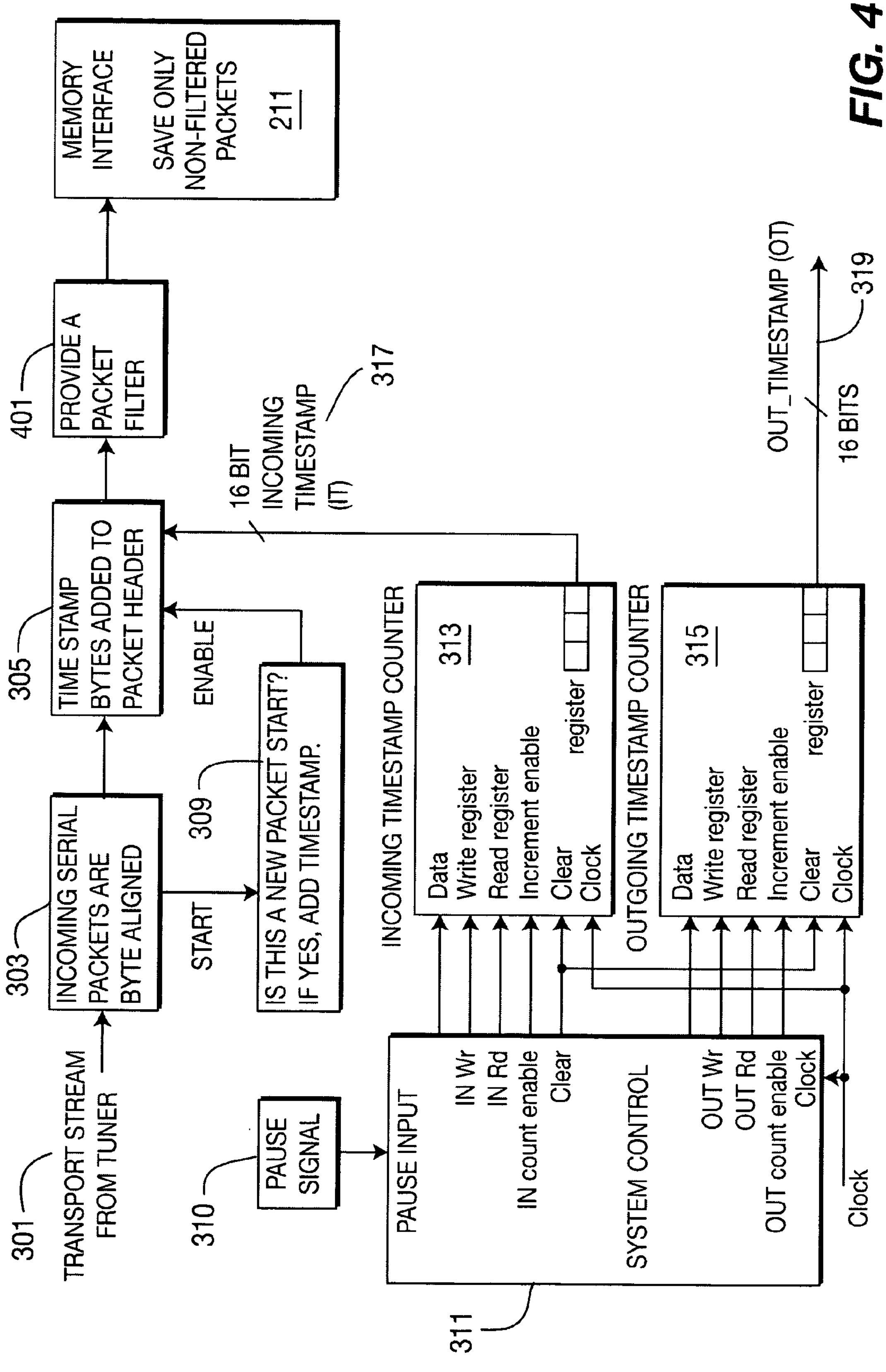
FIG. 4 is an exemplary method flow for global schedule pause processing at an input side according to another aspect of the present principles
Figure 5:
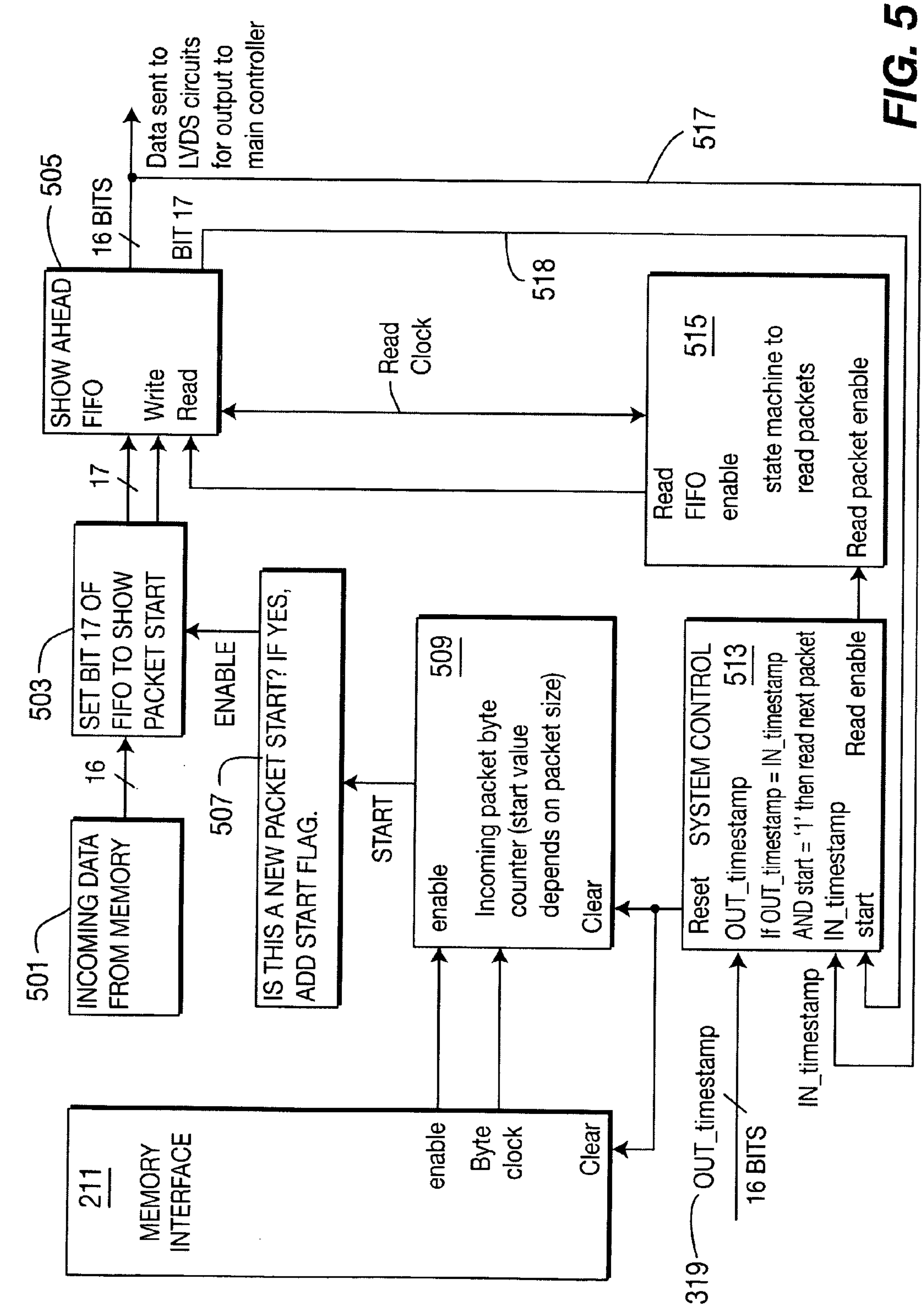
FIG. 5 is an exemplary method flow for global schedule pause processing at an input side according to another aspect of the present principles is an exemplary method flow for global program pause processing at an output side according to an aspect of the present principles.

FIGS. 3-4 depict exemplary method flow steps for global schedule pause processing at an input side 203, and FIG. 5 depicts exemplary method flow steps for global schedule pause functioning at an output side 204, respectively, of the packet processor 103 according to aspects of the present principles.

The processor 103 can include a capture/input module 203, a memory 211 and an output module 204 each in functional communication with one another. The capture module 203 and output module 204 can include a plurality of buffers 213 (not shown in module 204), which can preferably comprise, e.g., first-in-first-out (FIFO) buffers configured to process data such that the first data to be added to the queue is the first data to be removed, and processing proceeds sequentially in the same order. It is noted that the buffers 213 can also be included in the output control 217 of module 204.

The memory 211 can comprise any memory device, such as a hard disk drive (HDD), and/or preferably a non-volatile, solid-state memory device such as flash memory, which can be a more durable, efficient and suitable storage media, especially in high-altitude environments where air pressure might fluctuate, such as in airplane cabins. Since the majority of interruption periods, e.g., during a flight, can comprise announcements lasting only a minute or two, a minimum amount of memory is needed to cover a minimal system. Preferably, the memory 211 has storage capacity of, e.g., at least about 45 Mb/s for each transponder (an exemplary system setup can comprise, e.g., 32 tuners tracking 32 transponders).

Incoming data transport streams are input from tuners 201 to the buffers 213 for processing by the input module 203. The input module 203 can include an input controller 215, which itself can comprise at least a system control 311, an incoming timestamp counter 313, and an outgoing timestamp counter 315. The incoming timestamp counter 313 adds marker values/timestamps to incoming packets to register and acknowledge when packets are received and to improve data flow. For example, the incoming timestamp counter 313 is configured for marking when each incoming packet arrives from the tuner (e.g., by applying a time-based marker value to each incoming packet) and the outgoing timestamp counter 315 provides time-based marker values for each outgoing packet.

For example, as incoming serial packets are received they are byte aligned (step 303), and if it is determined that there is a new packet start, a timestamp is added (step 309), preferably to the packet header (step 305). In addition, step 309 can include flagging the packet with an extra 'start bit' to show when a packet begins. An exemplary timestamp can comprise, e.g., a 16 bit counter with a known clock reference that can be reset, programmed, or pre-loaded by the system controller. For example, a time reference about equal to ½ of the minimum single packet delivery time (~16 to 18 μs) can be used as the time stamp clock reference.

For example: Consider a 27 MHz clock reference that takes 1/27,000,000=37 ns per bit. Packets of 130 bytes*8 bits/byte=1040 bits. 37 ns*1040=38.5 μs per packet.

It is desirable to mark packets at least within one packet time so let's pick ½ of a packet time which is ~19 us so the frequency would be 1/19 us=~53 KHz. As an estimate, we use 2^10=1024 bits and took half of this as 512 which is 2^9. Therefore:

$$\text{Clock reference/(bits/packet)/2}=27\text{ MHz}/130*8/2=27\text{ MHz}/520=\sim52\text{ KHz}$$

Note that the addition of timestamps can result in the addition of extra data to each packet. For example, whenever a start bit is found, two bytes of timestamp data can be added to the packet header. The time-stamped packets are then sent to the buffer 213 (step 307) and on to the memory 211 for storage. As an example, an unstamped packet can comprise 130 bytes versus a time-stamped packet at 132 bytes.

Preferably, the software (e.g., processor 103) can build and store a navigation table/register using set intervals of time to contemporaneously record the IN_timestamp and the memory address in memory 211 where this data starts. This register can be used to keep track of where data is found in memory 211 with respect to its timestamp. Advantageously, this would enable very quick access to the desired data once a known delay or pause period is defined.

The outgoing timestamp counter 315 provides the output timestamps. Note that the OUT_timestamp counter 315 can be analogous in configuration and operation to the IN_timestamp counter 313. The outgoing timestamp counter 315 can use the same type of counter and same clock reference as the input timestamp counter 313 but the specific outgoing timestamp value will typically be equal or less than the incoming timestamp counter. This is because the outgoing counter 315 provides the timestamp for the memory access that represents the time that the viewer is watching. When a global pause occurs (pause mode/period begins), the outgoing counter 315 is stopped until the pause period is ended. This pause in the counting means the outgoing count/marker value normally is lower than the incoming count value. The outgoing counter reference with a lower value than the input counter reference indicates that the value is further back in time, which tracks the location of the start of the pause feature in the time domain.

The outgoing counter 315 is configured to be able to be reset, programmed, and/or pre-loaded by the system controller 311. Both counters 313, 315 are cleared at the start of the video service and begin counting, e.g., by setting both count enables high. The IN_timestamp counter 313 is constantly counting/marking incoming packets independent of any pause mode (i.e., regardless of whether the system is in a pause mode or non-pause mode) since it provides the timestamp/marker value for incoming data. The OUT_timestamp counter 315 also counts and follows the IN_timestamp counter 313, but stops incrementing/counting whenever a global pause mode is enabled.

A system and method according to the present principles provides a processor 103 configured to constantly watch and check for activation/triggering of a global pause signal 310. If a global pause signal 310 occurs, thus enabling a global pause mode, the input system control 311 stops the OUT_timestamp counter 315 from 'incrementing' (e.g., marking with further successive time-based marker values) for the duration of the global pause period/mode. One primary difference between the use of the counters 313, 315 is the offset in the OUT_timestamp counter 315 that is used to provide a real time output reference for the stored data. That is, when a pause period is over, the output timestamp counter 315 is referenced by an output program in the output controller 217 to find the corresponding input timestamp bytes that were captured when the packets arrived from the input counter 313. This output counter reference can comprise, e.g., the input timestamp counter minus the number of counts that represent the equivalent delay of the pause period. In one exemplary embodiment, the number of counts of the pause period can be programmed into the output counter 315 by the input system control 311.

Advantageously, by stopping the output counter 315 from incrementing during the pause period, the dataflow operation becomes automatic without requiring controller intervention. The system controller 311 could also read the output counter and then could add or subtract values from the OUT_timestamp counter 315 if repeated data or skipped data is desired. The output will then start counting again to provide the appropriate output timestamp reference until the next pause mode occurs. Note that if the output counter stops incrementing, the output data also stops since all of the incoming data timestamps are greater than the value being looked for.

For example, in the timeline shown below (Example 1) depicting an exemplary period of 20 minutes of streaming data content, a 5 minute pause period occurs starting from minute 10 to minute 15. While the data input continues to be written throughout the entire 20 minutes, at 10 minutes, the data output (reading) is stopped and the outgoing timestamp counter/marker value is noted. When the pause period is over at minute 15, the output counter searches for the output timestamp counter value (minute 10) in the input timestamped data to resume playback starting from minute 10. Note that after the pause, the next packet of data output would be the one following the last packet sent before the pause. The primary purpose of the timestamp counters is to ensure that the original transmission bitrate is maintained to avoid MPEG buffer overflows or underflows.

EXAMPLE 1

| | 0 min | . . . | 10 min (pause start) | 15 min (pause end) | . . . | 20 min. |
|---|---|---|---|---|---|---|
| In count: | 0 | . . . | 10 . . . | 15 | . . . | 20 . . . |
| Out count: | 0 | . . . | 10 . . . | 11 12 13 | . . . | 15 . . . 20 |

The input controller 215 is configured for both writing and reading the streaming data to or from memory 211. Details of the read and write operations and signals of the memory controller and interfaces are well known in the art and are not shown in FIG. 3, 4 or 5. Note that in all cases, the controller 215 is configured to continuously write incoming streams to the memory 211. Even during a pause period, although the system would not be reading (outputting) the data from the memory 211, incoming data would still need to be written. When the pause period is over and playback is resumed, both reading of the playback data and writing of the incoming data are simultaneously performed.

The output module 204 can include at least an output controller 217 which can comprise at least an output system control 513, state machine 515, a buffer 505, and an output circuit 219. The output system control 513 can include a comparator module 513 configured to check the incoming timestamps 517 of the data coming from memory 211 versus the desired timestamp to ensure that the bit buffers downstream do not overflow during the MPEG processing. As described above, for example, an additional bit in the FIFO can be used to flag the beginning of every packet to help count bytes as well as flag the timestamp in each packet.

In one exemplary embodiment, as shown in FIG. 4, the start of each new packet would set a bit to indicate the start of a packet (step 309) along with the added timestamp. This control bit could then be sent to the FIFO buffer (step 307) to be written into the memory interface, which can comprise a Flash memory drive 211. Advantageously, adding, e.g., an additional bit is an efficient method to mark the timestamps bytes and packet starts to reduce the amount of overhead logic. This 'start' bit that indicates a packet start and timestamp could continue with the packet through the memory 211 and be monitored by the new packet 507 and show packet start 503 blocks. In this exemplary embodiment, the start flag 518 would enable the comparison of the IN timestamp 517 of the packet 505 with the output of the OUT_timestamp counter 319 to hold the data until the timestamps match. The additional 'start' bit helps automate the flow of the data and reduces the amount of control logic.

In the embodiment of FIG. 4, a packet filter is provided (step 401) to screen the packets in real time to determine if they are to be saved in memory 211. Advantageously, this pre-selection of programs to be saved results in an overall reduction of data and helps reduce the bandwidth needed. Memory 211 thus saves only the non-filtered packets. Data streams to be saved can comprise programs which are popular, or which are otherwise appropriate for, or are likely to be viewed by, passengers.

In one embodiment, each packet processor 103 can include a delay/pause partition module for each tuner 201 so that when the data is played back, the system downstream can react the same. That is, each pause partition module can be found in a corresponding packet processor(s) 103. The partition module can be embodied in the memory 211 and enables individual storage of each tuner's output in a corresponding separate packet in the memory 211.

If all tuners are combined in the memory, then all tuners have channels with timestamps that could be equal. E.g., 8 or 16 tuners have 8 or 16 channels with timestamps that could be equal. If all of the tuners are combined into a common stream to the flash and/or HDD then extra data needs to be added to identify which packet came from which tuner. This would be done in the packet processor 103. There could be one packet processor per tuner or one packet processor per system serving N number of tuners.

In an embodiment using partitions, keeping the transport streams separated in the flash/HDD (e.g., via the pause partitions) advantageously simplifies the system and can be implemented by storing one tuner's output in its own packet on the memory (flash/HDD), storing the next tuner's output in another packet, and so on. Advantageously, in this embodiment the only difference is the packet management and not the bandwidth utilized for a defined system. The final architecture would be chosen based on bandwidth requirements versus the cost of the overhead for each additional packet processor.

A global pause control signal 310 can be provided and a pause function can accordingly be activated. According to one aspect, the packet processor 103 is configured to constantly check for activation of the global pause signal 310 during data delivery, and activate the global pause mode in response to triggering of the signal 310. Triggering/activation events for the global pause signal 310 can comprise, e.g., manual activation of a global pause button, or an automated activation.

In one embodiment, a multiplexer can be added (e.g., see 223 in FIG. 2) to this system, to enable switching between either real-time or stored (paused) content from the memory 211. For instance, guide packets could be passed in real time to the receivers to maintain appropriate real time clock references versus the paused clock references. This multiplexer could also be used for live video and audio feeds from the cockpit during the pause modes to allow the data flow.

FIG. 5 shows the output side of a global schedule pause processing method according to one aspect of the present principles. When the interruption period/pause delay is known, the navigation table can be used to find the proper read address for the data. Note that during this entire time, the incoming data is being stored in the memory without any interruptions. The desired data 501 is streamed from the memory 211, and each new packet is marked with a start flag (step 507). That is, each start of packet can be marked on an additional bit (step 503) and sent to the "Show-ahead" FIFO (505). For example, in the case of a 16 bit packet, one additional bit (bit 17) can be added. A "show ahead" type of FIFO places the data for the next read on the output bus so that only a read is required to latch the FIFO data value. In addition, this ensures that the timestamp can be found whenever the start bit (bit 17 in this example) is equal to '1'.

The system will not read the next packet of data from the FIFO until the system controller/comparator 513 compares the OUT-timestamp 319 with the IN-timestamp 517. In this example, when the start flag is equal to '1' and the OUT and IN-timestamps are equal values, the next packet is read. Advantageously, this re-creates the original bit-rates found when the data was initially received, which avoids overflow of the MPEG buffers downstream. Once the values are equal, the state machine 515 will enable the read for an entire packet. The state machine 515 will stop the data flow again until the IN_timestamp 517 (e.g., found in the header data stored in the flash memory) is less than or equal to the OUT_timestamp 319.

An exemplary method for providing a global system pause function in an broadcast television system can be described as follows. While the system is waiting to be enabled (e.g., for the television service to be activated or on), the packet processor sets both incoming and outgoing timestamp counters equal and watches for a pause or interruption period to occur.

If a pause occurs, a pause mode is enabled and the outgoing timestamps (OT) are stored. During the pause mode a reference table is preferably created showing, e.g., incoming (IT) timestamps, tuner data, and start and end flash/HDD storage locations. The incoming data stream is preferably stored in the memory 211. In one exemplary embodiment, each user set top box (STB) can receive a message to indicate a pause mode, e.g., each STB can receive another data stream with a still picture, on-screen display (OSD), or a picture freeze with overlay to indicate a pause mode. During the pause mode, the system constantly checks to see whether the pause has ended. If the pause is stopped/ended, the timecodes (e.g., counter/marker value) and end address corresponding to the pause stop time are stored.

At a 'pause end', the OT counter is programmed with the pause_start location and data is streamed from the memory 211 to each set top box (receiver). That is, the navigation table is referenced to find the starting address for the IT timecode/marker value equal to the pause_start location, and the data is then read from the memory 211 between the start and end addresses. For example, if the pause has ended, the processor looks up pause_start=OT location in the stored IT table to get memory address location for data beginning at the pause_start. The next HDD read is found as the next table entry, and so on.

The streaming is continued using the OT as the timestamp reference while the incoming data is marked with the IT counter. If another pause occurs, the OT register value at pause_start is stored and a pause mode is entered again until the pause mode ends. The above steps will continue until a pause is encountered again or the TV service is ended.

Advantageously, playing back content that is regulated by the timestamps/marker values ensures that the original transport bit rates are being reconstructed on the output data from the memory 211. These original bit rates were carefully constructed at the transmitters to be sure that the MPEG bit buffers will not overflow or underflow during the decoding of the transport streams. This is also why the use of solid state flash can be advantageous over HDD magnetic disc drives in the present application since the HDDs can have large variations in the access times for reading and writing data while flash drives do not.

Figure 6:
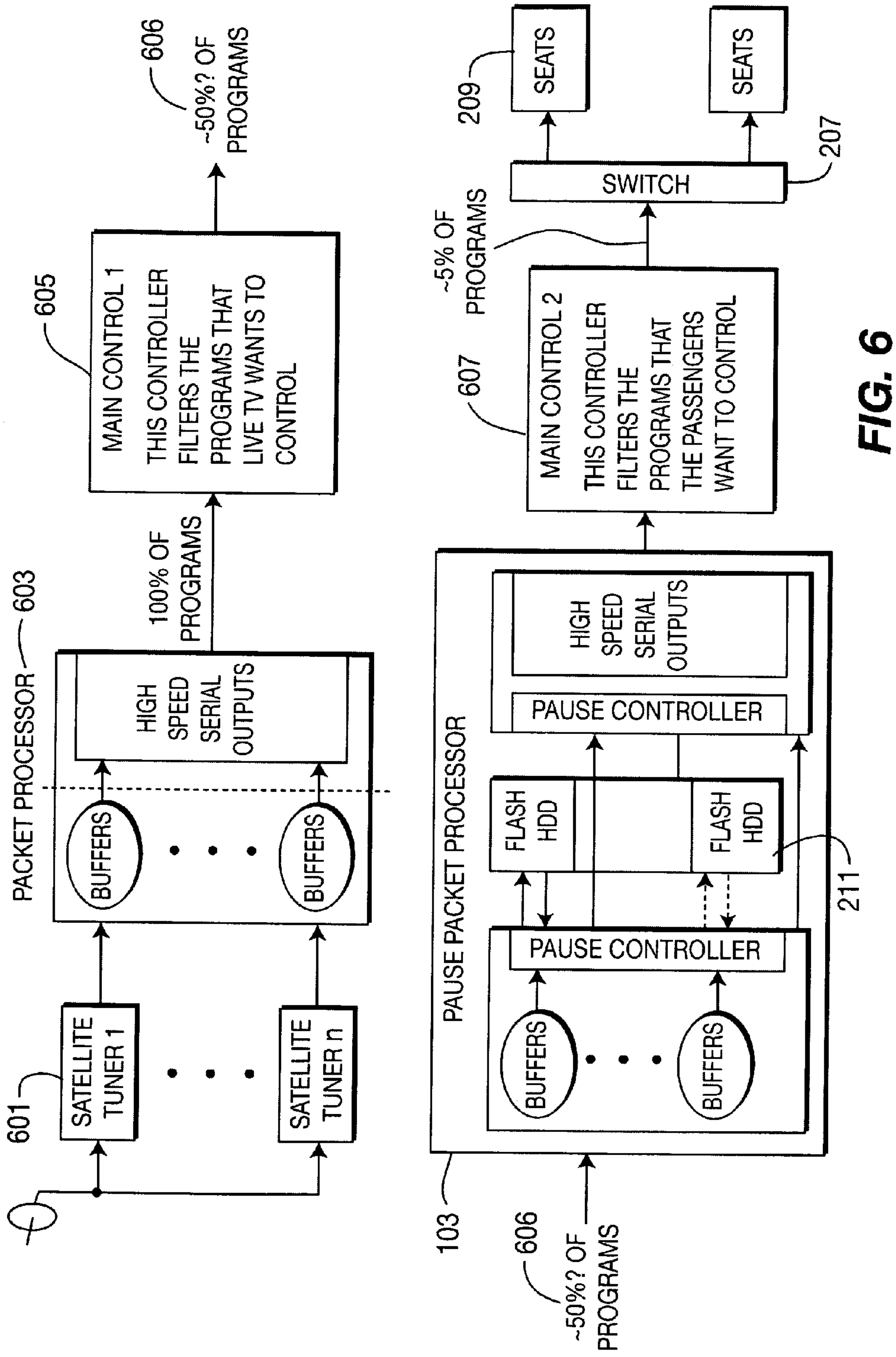
FIG. 6 is an exemplary schematic diagram of a system setup for providing a global schedule pause function in a broadcast multimedia system according to an aspect of the present principles.
Figure 7:
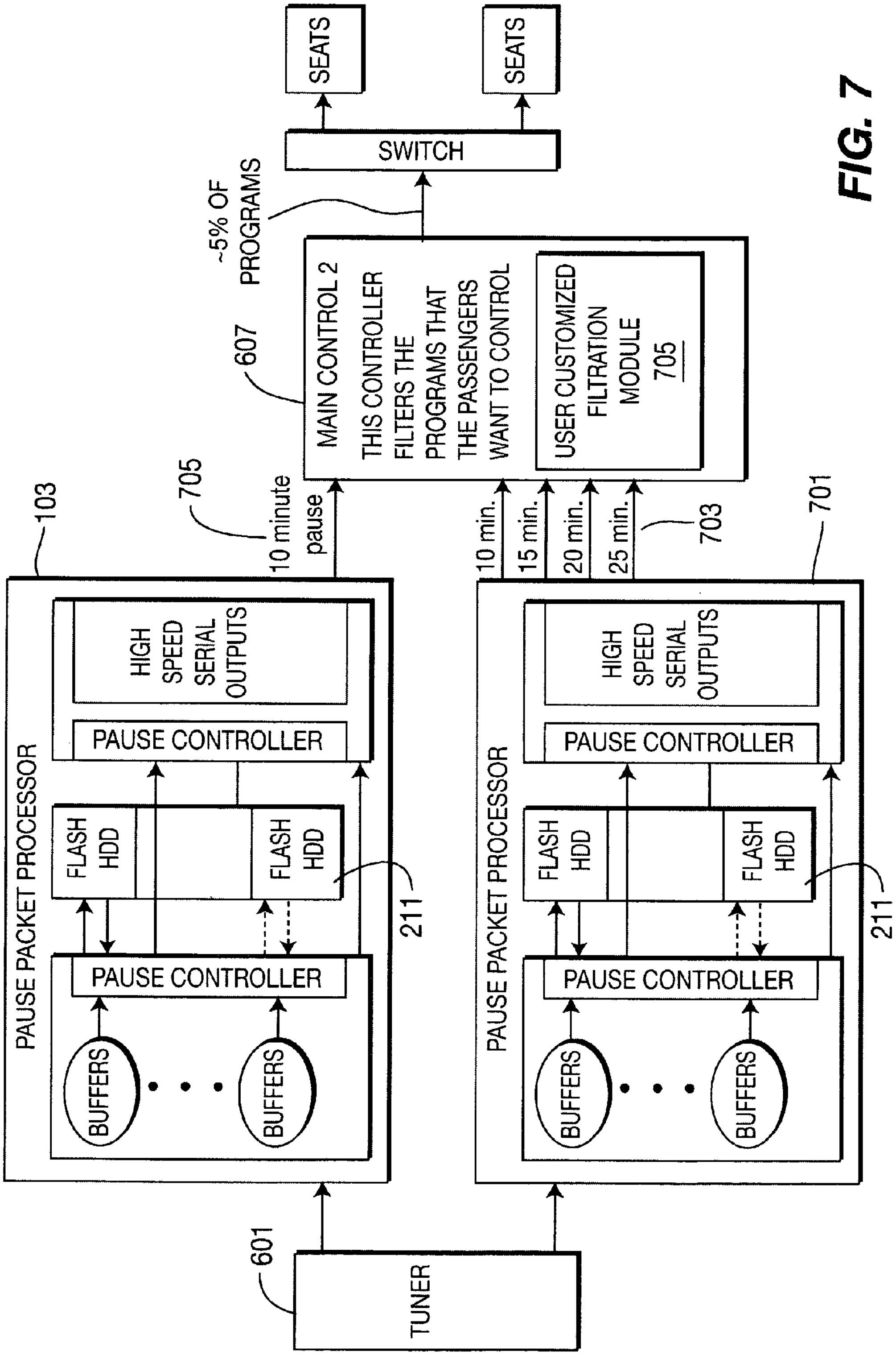
FIG. 7 is an exemplary schematic diagram of a system setup for providing a global schedule pause function in a broadcast multimedia system according to an aspect of the present principles.

FIGS. 6 and 7 are schematic diagrams of two exemplary system setups for providing a global schedule pause function in a broadcast multimedia system according to aspects of the present principles. In FIG. 6, a first main control 605 can be provided connected to a packet processor 603, which receives data streams from tuners 601. The first main control 605 is configured for receiving all the programs from packet processor 603 and filtering the programs to provide a reduced amount of programs (primary filtered programs 606), as desired by the service provider (e.g., satellite video service). For example, this can result in a 50% reduction of overall programs, as shown in FIG. 6.

The primary filtered programs 606 are input to the pause-enabled packet processor 103 for processing e.g., as described above with respect to FIG. 2. Advantageously, the packet processor 103 has a much reduced amount of data which it needs to process and store, which allows new services, such as providing multiple delayed start times of the same program, offering a 30 minute program every 30 minutes (as opposed to only every 6 hours via live satellite), etc.

A second main control 607 is provided functionally connected to the pause packet processor 103 and includes a user-customized filtration module 705 for performing a secondary filtering process, e.g., for further filtering the primary filtered programs 606 in accordance with viewer requests to eliminate programs that the passengers/viewers do not wish to control or are unlikely to view. This results in an even further reduction in the overall amount of data to be output to the viewers. For example, as shown in FIGS. 6 and 7, this can result in only 5% of the total data streams output from the tuners 601 being sent to the viewers 209.

As shown in FIG. 7, an alternate embodiment can be provided in which a separate "popular stream" packet processor 701 can be provided in addition to the packet processor 103. Both the pause packet processor 103 and popular stream packet processor 701 receive data input from tuners 601. The 'popular' streams would be routed directly to 701; that is, the popular stream processor 701 is configured to store programs which are desired by or otherwise deemed likely to be watched by viewers. The pause packet processor 103 stores the remaining streams in a normal manner.

The stored programs of processor 103 can be paused for a certain time interval, which can be dependent on the limits of the system memory and bandwidth, for example, as shown here a 10 minute delay can be provided for all its stored programs. Since the popular stream processor 701 typically processes a much reduced amount of data streams, multiple delayed starts 703 can be provided in which a single 'popular' program can be viewed at multiple start times, e.g., with a 10 minute delay, a 15 minute delay, a 20 minute delay, etc. The amount of time delay (pause buffer) which can be provided for each program depends on the total amount of memory available.

In addition, the popular stream processor 701 can be configured to offer a program at more frequent viewing times. For example, where a 30 minute program was offered only every 6 hours on live satellite television, the system and method according to the present principles can offer it at more frequent intervals, such as every 30 minutes.

FIG. 8 is an exemplary method flow for global schedule pause processing according to an aspect of the present principles. Initially, the system is turned on, e.g., preferably before the flight begins, to acquire guide data assuming all tuners are active. For example, if the pause buffer is 30 minutes, start 30 minutes early to optimize the system memory and the offering to the passengers/viewers.

In step 801 the program guide data is acquired and analyzed. For example, the following information can be determined from the guide:

a. Length of program
b. Stream IDs
c. Percent of program in progress
d. Status of program from Pay-Per-View, Local Channel, . . .
e. Title of program
f. Rating of program In step 803, check if multiple streams for the same program title are transmitted, e.g., such as standard definition (SD) as well as high definition (HD). If so, filter the HD streams in situations where the passengers are provided with only an SD display.

In step 805, consider the size of the pause buffer and review the program guide considering the pause function. Re-run the guide to accommodate the pause as well as any multiple time-delayed start content.

In step 807, the programs are filtered to save only the desired data streams up to the limit of the system bandwidth for reading the streams. Preferably, only the programs that have a chance to be selected and watched by the passenger or the service provider are saved.

In step 809 it is assessed whether a separate popular stream packet processor is being employed. If yes, the most popular programs are saved in the memory of the popular stream processor to allow enough bandwidth for, e.g., multiple reads and one write (step 811). Multiple time-delayed start times can be created for popular programs, if applicable, and/or multiple listings showing real-time vs. delayed time for each program (step 813). In this way, a revised or updated program guide can be created. In step 815, a program guide from which the viewer can select only the non-filtered programs (at any desired start time which is offered) is created. In step 817, the desired data streams saved, e.g., in a global memory, can be further filtered in accordance with viewer requests, to send the desired program to each viewer.

If at step 809 it is determined that a popular stream processor is not being used, the method proceeds directly to step 813.

Although the embodiment which incorporates the teachings of the present principles has been shown and described in detail herein, those skilled in the art can readily devise many other varied embodiments that still incorporate these teachings. Having described preferred embodiments for a system and method for providing a global schedule system pause function for broadcast multimedia programming (Which are intended to be illustrative and not limiting), it is noted that modifications and variations can be made by persons skilled in the art in light of the above teachings. It is therefore to be understood that changes can be made in the particular embodiments of the principles disclosed which are within the scope and spirit of the inventive principles as outlined by the appended claims. Having thus described the invention with the details and particularity required by the patent laws, what is claimed and desired protected by Letters Patent is set forth in the appended claims.

The invention claimed is:

1. A system for providing a global program guide pause function in a broadcast multimedia system comprising:

a first main control configured for processing audio and video data content received from a packet processor, the first main control comprising:

an analyzer that acquires and analyzes program guide data to determine multiple time-delayed start content;

a filter that filters undesired content and enables desired data streams to be saved in at least one global memory device; and a guide that creates a program guide comprising only non-filtered programs being offered at time-delayed start times wherein the guide is configured to create multiple listings in the program guide showing a real-time versus a delayed-start time for each program.

2. The system of claim 1, wherein the analyzer is further configured to assess the size of pause buffers at the packet processor.

3. The system of claim 1, wherein the audio and video data content received from the packet processor comprises data packets received from at least one tuner.

4. The system of claim 3, further comprising a popular stream packet processor functionally connected to the at least one tuner and having at least one global memory device configured for saving data packets from the tuner corresponding to popular programs.

5. The system of claim 4, wherein each popular program saved at the popular stream packet processor is offered at multiple time-delayed start times.

6. The system of claim 1, wherein the pause function memory device is provided in a pause packet processor configured for storing paused data content.

7. The system of claim 6, further comprising a second main control functionally connected to at least the pause packet processor, the second main control including a user-customized filter that filters the primary filtered content in accordance with viewer requests.

8. The system of claim 1, wherein the multiple time-delayed start content comprises a plurality of start times being provided for each program.

9. A system for providing a global program guide pause function in a broadcast multimedia system comprising:

a first main control configured for processing audio and video data content received from a packet processor, the first main control comprising:

an analyzer that acquires and analyzes program guide data to determine multiple time-delayed start content;

a filter that filters out undesired content and enables desired data streams to be saved in at least one global memory device;

a guide that creates a program guide comprising only non-filtered programs being offered at time-delayed start times, the guide further configured to create multiple listings in the program guide showing a real-time versus a delayed-start time for each non-filtered program; and a popular stream packet processor configured for saving data content corresponding to popular programs.

10. The system of claim 9, wherein the analyzer is further configured to assess the size of pause buffers at the packet processor.

11. The system of claim 9, wherein the audio and video data content received from the packet processor comprises data packets received from at least one tuner.

12. The system of claim 9, wherein the popular stream packet processor receives data from at least one tuner and includes at least one global memory device configured for saving data content from the said at least one tuner corresponding to popular programs.

13. The system of claim 12, wherein each popular program saved at the popular stream packet processor is offered at multiple time-delayed start times.

14. The system of claim 9, wherein the global memory device is provided in a pause packet processor configured for storing paused data content.

15. The system of claim 14, further comprising a second main control functionally connected to the pause packet processor, the second main control including a user-customized filter that filters the primary filtered content in accordance with viewer requests.

16. A method for providing a global program guide pause function in a broadcast multimedia system, comprising the steps of:

analyzing program guide data to determine multiple time-delayed start content;

filtering undesired data content to save desired data content and enabling desired data streams to be saved in at least one global memory device; and creating at least one of multiple start times for programs and deriving multiple listings showing a real-time versus a delayed start time for each program in the desired data content.

17. The method of claim 16, wherein the step of filtering comprises filtering out high definition (HD) streams from the received audio and video data content.

18. The method of claim 16, wherein the pause function memory device is configured for storing paused data content.

19. The method of claim 16, further comprising the step of filtering the desired data content in accordance with viewer requests.

20. The method of claim 16, further comprising the step of determining a size of pause buffers to determine multiple time-delayed start content.

* * * * *